US008457442B1

(12) United States Patent
Wang et al.

(10) Patent No.: US 8,457,442 B1
(45) Date of Patent: Jun. 4, 2013

(54) METHODS AND APPARATUS FOR FACIAL FEATURE REPLACEMENT

(75) Inventors: Jue Wang, Kenmore, WA (US); Elya Shechtman, Seattle, WA (US); Lubomir D. Bourdev, San Jose, CA (US); Fei Yang, Highland Park, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 252 days.

(21) Appl. No.: 12/955,071

(22) Filed: Nov. 29, 2010

Related U.S. Application Data

(60) Provisional application No. 61/375,659, filed on Aug. 20, 2010.

(51) Int. Cl.
*G06K 9/36* (2006.01)

(52) U.S. Cl.
USPC ......................................................... 382/285

(58) Field of Classification Search
None
See application file for complete search history.

(56) References Cited

U.S. PATENT DOCUMENTS

| 6,556,196 | B1 * | 4/2003 | Blanz et al. | 345/419 |
| 7,697,787 | B2 * | 4/2010 | Illsley | 382/295 |
| 2003/0007700 | A1 * | 1/2003 | Gutta et al. | 382/282 |
| 2007/0237421 | A1 * | 10/2007 | Luo et al. | 382/284 |
| 2011/0298799 | A1 * | 12/2011 | Mariani et al. | 345/420 |

OTHER PUBLICATIONS

Blanz, "A learning-based high-level human computer interface for face modeling and animation," Proceedings of the ICMI 2006 and IJCAI 2007 International Conference of Artificial Intelligence for Human Computing, pp. 296-315, 2007.*
Blanz et al., "Exchanging faces in images," In Proc. of Eurographics, vol. 23, pp. 669-676, 2004.*
Cheng et al., "3D-Model-based Face Replacement in Video," In SIGGRAPH '09: Posters, p. 29:1, New York, NY, USA, 2009.*
Yang et al., "Expression Flow for 3D-Aware Face Component Transfer," ACM Trans. Graph. 30, 4, Article 60, Jul. 2011.*
Song et al., "A Generic Framework for Efficient 2-D and 3-D Facial Expression Analogy," IEEE Transactions on Multimedia, vol. 9, No. 7, Nov. 2007.*
Lee et al., "Estimation of 3D Faces and Illumination from Single Photographs Using Bilinear Illumination Model," In Proceedings Rendering Techniques 2005: Eurographics symposium on rendering: Konstanz, Germany, Jun. 29-Jul. 1, 2005.*
Wen et al., "Face Relighting with Radiance Environment Maps," Proceedings of the 2003 IEEE Computer Society Conference on Computer Vision and Pattern Recognition (CVPR'03), 2003.*
Neel Joshi, Wojciech Matusik, Edward H. Adelson, David J. Kriegman, Personal photo enhancement using example images, ACM Trans. Graph., vol. 29, No. 2. 2010, pp. 1-15.
Mark Everingham , Josef Sivic , Andrew Zisserman, "Hello! My name is . . . Buffy"—Automatic naming of characters in TV video, Proc. British Machine Vision Conference (BMVC), 2006 pp. 1-10.

(Continued)

*Primary Examiner* — Barry Drennan
*Assistant Examiner* — Andrew Moyer
(74) *Attorney, Agent, or Firm* — Wolfe-SBMC

(57) ABSTRACT

A set of feature points for defining features of a face is detected in a target image and a reference image. The target image is warped to accommodate a selected feature from the reference image using the set of feature points and a set of three-dimensional models. The reference image is warped to a pose of the target image using the set of feature points and the set of three-dimensional models. The selected feature is copied from the reference image to the target image.

20 Claims, 11 Drawing Sheets

OTHER PUBLICATIONS

Aseem Agarwala, Mira Dontcheva, Maneesh Agrawala, Steven Drucker, Alex Colburn, Brian Curless, David Salesin, Michael Cohen. Interactive digital photomontage. ACM Transactions on Graphics, vol. 23, Issue 3, 2004 pp. 1-4.

T.F. Cootes and C.J. Taylor and D.H. Cooper and J. Graham. Active shape models—their training and application. Computer Vision and Image Understanding, vol. 61, No. 1, January, pp. 38-59, 1995 pp. 1-12.

T. F. Cootes, G. J. Edwards, and C. J. Taylor. Active appearance models. IEEE Transactions on Pattern Analysis and Machine Intelligence, 23(6):681-685, 2001 pp. 1-5.

L. Gu and T. Kanade. A Generative Shape Regularization Model for Robust Face Alignment. Proceedings of the 10th European Conference on Computer Vision, Marseille, France, 2008. pp. 1-14.

Christian Vogler, Zhiguo Li, Atul Kanaujia, Siome Goldenstein, Dimitris N. Metaxas. The Best of Both Worlds: Combining 3D Deformable Models with Active Shape Models. Int'l Conf. Computer Vision (ICCV), 2007. pp. 1-7.

P. Felzenszwalb and D. Huttenlocher. Pictorial structures for object recognition. International Journal of Computer Vision, vol. 61, No. 1, pp. 55-79, Jan. 2005. pp. 1-42.

Stephen Milborrow and Fred Nicolls. Locating Facial Features with an Extended Active Shape Model. Proceedings of the 10th European Conference on Computer Vision, 504-513, 2008. pp. 1-11.

P. Viola and M. Jones. Rapid object detection using a boosted cascade of simple features. In Proc. Computer Vision and Patten Recognition, pp. 511-518, 2001.

Li Zhang, Noah Snavely, Brian Curless, and Steven M. Seitz. Spacetime Faces: High-resolution capture for modeling and animation. In ACM SIGGRAPH Proceedings, Los Angeles, CA, Aug. 2004. pp. 1-11.

Simon Baker, Ralph Gross, Iain Matthews. Lucas-Kanade 20 Years On: A Unifying Framework. International Journal of Computer Vision. 56(3), pp. 221-255, 2004.

Patrick Pérez, Michel Gangnet, Andrew Blake. Poisson image editing. ACM Trans. Graph., vol. 22, No. 3. pp. 313-318, Jul. 2003.

\* cited by examiner

Target image
910

Reference image
1014

Expanded mouth
926

Transformed target image
924

Reoriented mouth
1022

Transformed reference image
1020

METHODS AND APPARATUS FOR FACIAL FEATURE REPLACEMENT

BACKGROUND

This application claims benefit of priority to U.S. Provisional Application Ser. No. 61/375,659, which was filed on Aug. 20, 2010.

DESCRIPTION OF THE RELATED ART

Relatively recent improvements in the ability to capture images as digital data have improved a number of aspects of the experience of photography. The raw number of photographs that a single camera can collect and store without forcing the photographer to exchange storage media has risen by an order of magnitude in the last decade. Rather than conserve photographic exposures to avoid the need to exchange chemical film cartridges that typically held a few dozen images, current technology enables a user of a camera to continue shooting and storing to a memory card that holds hundreds of images.

Similarly, exchange of memory cards is simpler than exchange of film cartridges. Memory cards are exchanged more quickly because of the fact that memory cards need not be rewound prior to exchange. This fact alone keeps the camera in service to capture images during a greater portion of the working day. Similarly, the elimination of the need to physically move film media within the camera has improved the rapidity with which images can be captured. Simultaneously, increasingly feature-rich cameras have enabled photographers to capture images that previously would only have been possible with prohibitive investments in additional lenses (and time lost to lens changes).

Each of these developments has encouraged an expansion in the number of images of a particular person that can be captured, stored and used in subsequent image processing.

SUMMARY

A set of feature points for defining features of a face is detected in a target image and a reference image. The target image is warped to accommodate a selected feature from the reference image using the set of feature points and a set of three-dimensional models. The reference image is warped to a pose of the target image using the set of feature points and the set of three-dimensional models. The selected feature is copied from the reference image to the target image.

Figure 1:
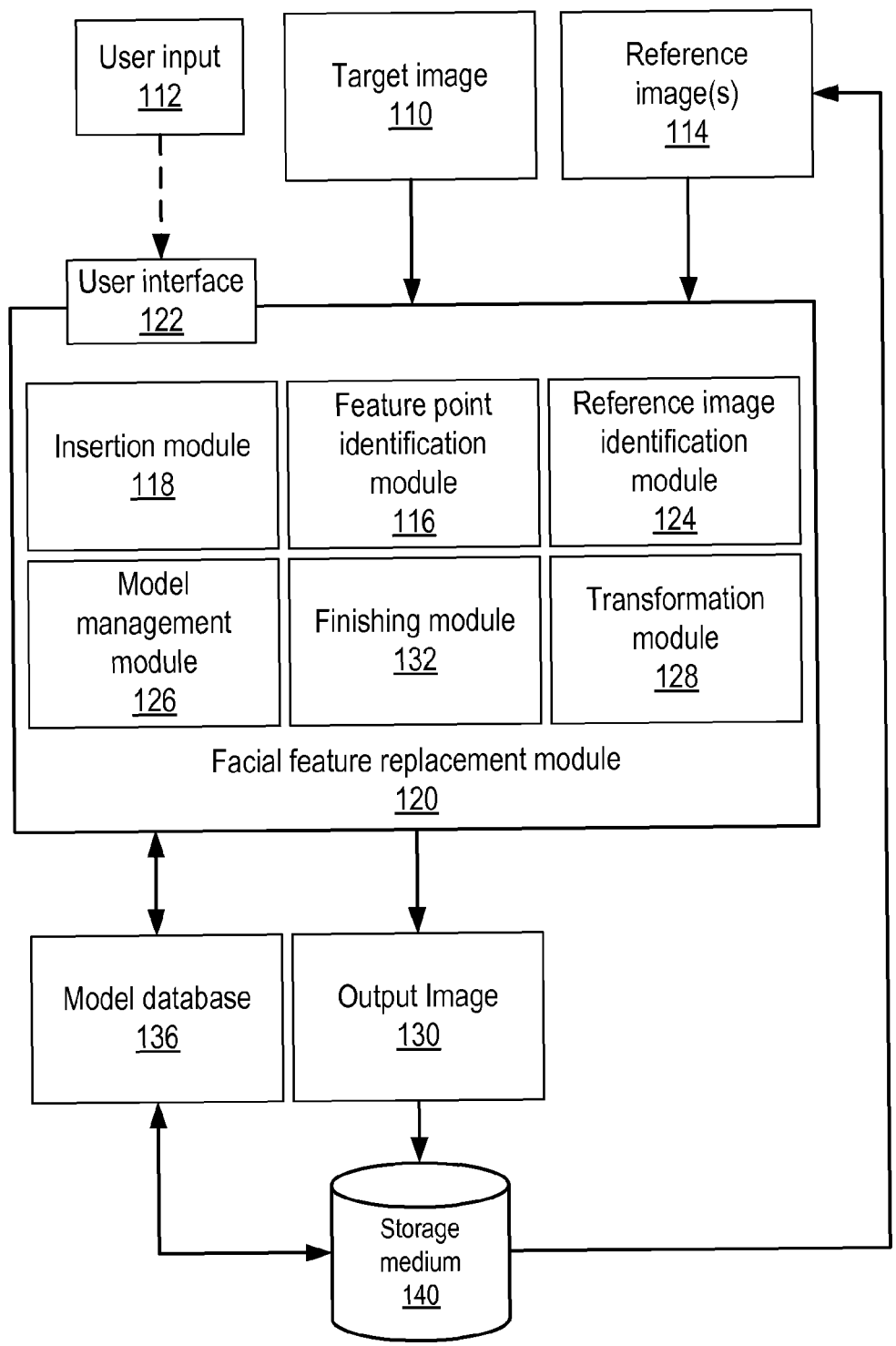
FIG. 1 illustrates a module that may be used to implement facial feature replacement according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Facial Feature Replacement

Various embodiments of methods and apparatus for facial feature replacement enable a user of such an apparatus or method to select a facial feature from a reference image of a face and insert that facial feature onto a target image of a face. Feature points, such as fiducial points, landmarks, or other reference points, on each of the reference image and the target image are selected. The feature points facilitate quantitative definitions of locations of facial features for operations performed on the target and reference images, such as the copying of the selected feature from the reference image and insertion of the selected feature into the target image. In some embodiments, identification of feature points and of appropriate reference images is automated. In other embodiments, identification of feature points and of appropriate reference images is controlled by user selection.

If necessary, transformations of the target and reference images are performed prior to copying of the selected feature from the reference image and insertion of the selected feature into the target image. The transformations allow the selected feature from the reference image to realistically fit within the target image. In some embodiments, the transformations include warping the reference image and/or the target image. The warping of the reference image and/or the target image can be controlled by an optical flow according to a 3-dimensional (3D) rotation and/or deformation.

In such embodiments, the reference image and the target image are compared to a set of 3-dimensional models of a human face. Models corresponding to the target image and the reference image are selected on the basis of the correspondence of the spatial alignments of their features to the spatial alignments of the features of the reference image and the target image, and the above-referenced 3-dimensional rotation and/or deformation is calculated as the movement of features of the face between the two models. This 3-dimensional rotation and/or deformation is then used to determine the optical flow that controls the warping of the reference image and the target image.

After copying of the selected feature from the reference image and insertion of the selected feature into the target image, finishing operations are performed. Finishing operations can include, among others, color correction or blending to smooth the image resulting from insertion of the selected feature into the target image.

FIG. 1 illustrates a facial feature replacement module that may implement one or more of the facial feature replacement editing techniques and tools briefly described above, as well as other features described below with respect to FIGS. 2-11B. Facial feature replacement module 120 may, for example, implement one or more of a facial feature replacement copy-and-paste tool, a facial feature replacement selection tool, a facial feature replacement brush tool, and a facial feature replacement spot healing tool. FIG. 12 illustrates an example computer system on which embodiments of facial feature replacement module 120 may be implemented. Facial feature replacement module 120 receives as input a target image 110 and one or more reference images 114.

Example reference and target images are described below with respect to FIG. 3. Facial feature replacement module 120 may receive user input 112 activating a facial feature replacement tool. Facial feature replacement module 120 then edits the target image 110, according to user input 112 received via user interface 122, by inserting a feature selected from reference image 114 into target image 110 after the performance of any necessary transformations, such as, in some embodiments, warping of target image 110 and reference image 114. Further, facial image replacement module 120 may perform any necessary finishing operations such as color correction or blending to smooth the image resulting from insertion of the selected feature into the target image. Facial feature replacement module 120 generates as output one or more output images 130. Output image(s) 130 may, for example, be stored to a storage medium 140, such as system memory, a disk drive, DVD, CD, etc. Storage medium 140 may also store reference images 114.

In some embodiments, facial feature replacement module 120 may provide a user interface 122 via which a user may interact with the facial feature replacement module 120, for example to invoke facial feature replacement tool, to indicate a selection, and to acknowledge or reverse a facial feature replacement as described herein. In some embodiments, user interface 122 may provide user interface elements whereby the user may select options including, but not limited to, the automated or manual selection of reference images and automated or manual identification of feature points.

A feature point identification module 116 supports the identification within target image 110 and reference image 114 of feature points that facilitate quantitative definitions of locations of facial features for operations performed on target image 110 and reference image 114, such as the copying of the selected feature from reference image 114. Further, feature points are used to support transformations such as translation, rotation and warping that are used to allow the selected feature from the reference image to realistically fit within the target image. Feature points are described in greater detail below with respect to FIGS. 6-7. In one embodiment, feature points are manually selected by a user through user interface 122 and are recorded and logically associated with features by feature point identification module 116. In an alternative embodiment, feature points are automatically identified, recorded and logically associated with features by feature point identification module 116. Further, some embodiments allow for selection of manual or automatic identification or for hybrid approaches that involve both manual selection and automatic identification.

A reference image identification module 124 handles the processing of reference images. In some embodiments, reference images are manually selected by a user through user interface 122 and their locations are recorded or copies to designated storage are made by reference image identification module 124. In alternative embodiments, reference image identification module 124 selects an appropriate image from among images on storage medium 140 for use in facial feature replacement on the basis of the feature selected for replacement and other criteria having to do with the content of target image 110 and/or reference image 114. Criteria include but are not limited to the nature of the feature selected, the similarity of poses between target image 110 and/or reference image 114 and photographic criteria such as similarity of illumination between target image 110 and/or reference image 114.

In some embodiments, a model management module 126 associates target image 110 and reference image 114 with 3-dimensional facial models from a model database 136 stored in storage medium 140. Reference image 114 and target image 110 are compared to a set of 3-dimensional models of a human face. Such models are discussed below with respect to FIG. 8. More specifically, in one embodiment, for each of reference image 114 and target image 110, the location of feature points on each of a set of models of a human face is compared to the location of corresponding feature points (e.g., the corner of a mouth or the tip of a nose) recorded by feature point identification module 116. Each model thus compared is scored for its correspondence to reference image 114 and target image 110. In one embodiment, the scoring is generally derived based on the differences between the distances between the location of feature points on each of the set of models of a human face and the distances between the locations of corresponding feature points recorded by feature point identification module 116. In some embodiments, the scoring is weighted to place emphasis on the correspondence of certain features. For each of reference image 114 and target image 110, model management module 126 selects a best-fitting model from model database 136. In some embodiments, model management module 126 is configured to build new models for inclusion in model database 136 and can build models of reference image 114 and target image 110.

A transformation module 128 uses the correspondence of feature points between the models selected as best fits for reference image 114 and target image 110 to calculate a 3-dimensional motion flow between the models selected as best fits for reference image 114 and target image 110. The 3-dimensional motion flow between the models selected as best fits for reference image 114 and target image 110 roughly corresponds to the difference in position of the face between reference image 114 and target image 110. This 3-dimensional motion flow between the models selected as best fits for reference image 114 and target image 110 is then projected onto a 2-dimensional image plane to generate a 2-dimensional optical flow field. Based on the optical flow field, reference image 114 and target image 110 are warped through pixel interpolation to facilitate the fit of the feature selected from reference image 114 into target image 110. Motion flow calculation is discussed below with respect to FIG. 9 and warping is discussed below with respect to FIG. 10. Generally speaking, a target image is warped to accommodate the shape of the face in the target image to receive the feature being imported from the reference image. The reference image is warped to correct the orientation (or pose) of the feature being exported such that it will match the orientation or pose of target image.

Additionally, transformation module 128 performs two dimensional alignment of the intermediate images resulting from warping of reference image 114 and target image 110. This two dimensional alignment further facilitates the fit of the feature selected from reference image 114 into target image 110. Transformation module 128 may also perform illumination correction to achieve shadows and to normalize the differences in the position, intensity and color temperature of light applied to photographic subjects during the creation of reference image 114 and target image 110.

An insertion module 118 performs cutting of the desired reference feature from reference image 114 and pasting of the reference feature into target image 110. Finishing module 132 performs operations such as color correction and blending to reduce the appearance of insertion associated with integration of the feature selected from reference image 114 into target image 110. Blending is discussed below with respect to FIGS. 11A-11B.

Figure 2:
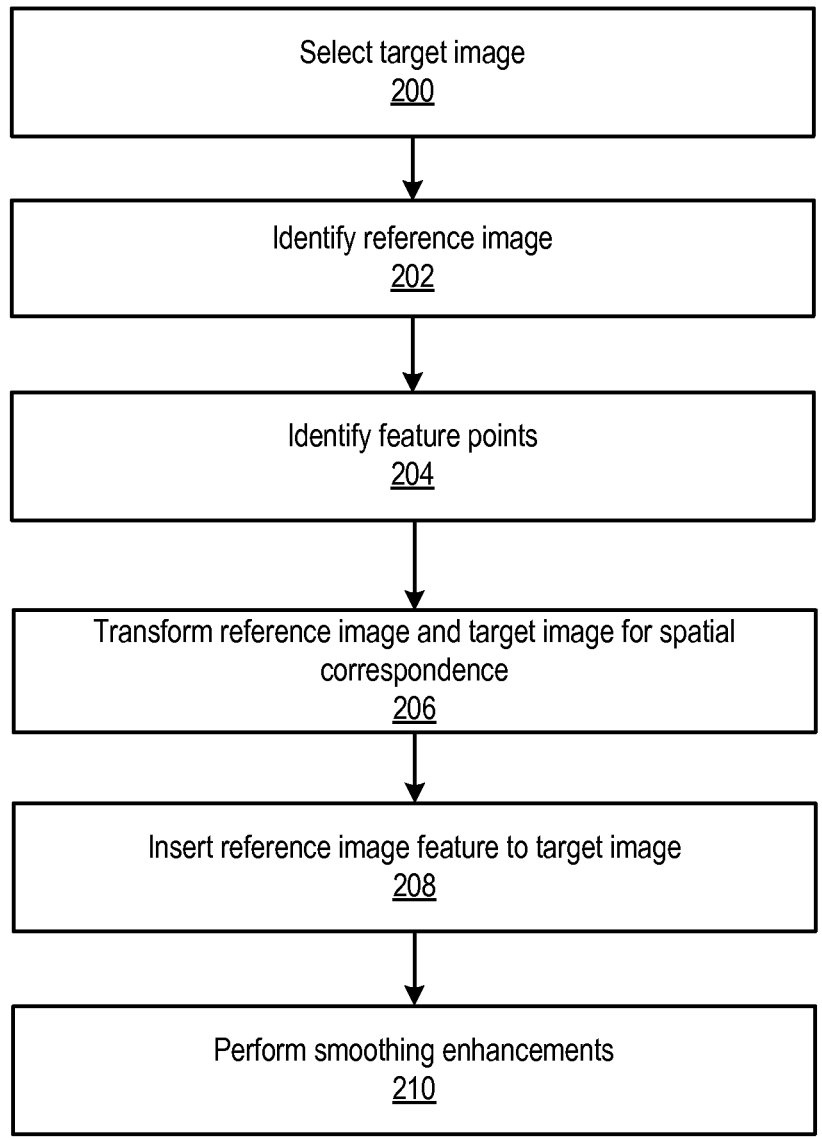
FIG. 2 depicts a high-level logical flowchart of a process for implementing facial feature replacement according to some embodiments.

In some embodiments, the operations performed by facial feature replacement module 120 are executed as an integrated facial feature replacement procedure. FIG. 2 depicts a high-level logical flowchart of a process for implementing facial feature replacement according to some embodiments. A target image is selected to receive a replacement feature (200). A reference image containing the feature desired to be inserted into the target image is selected (202). Feature points are identified (204). The reference image and target image are transformed to facilitate spatial correspondence (206). The reference image feature is copied and inserted into the target image (208). Smoothing enhancements are performed (210).
Image Examples of Facial Feature Replacement and Intermediate Results FIG. 3 illustrates inputs to and results of a process for implementing facial feature replacement according to some embodiments. A target image 310 is the baseline image into which a feature is intended to be inserted. In the example illustrated with respect to FIG. 3, target image 310 includes a face 312 with a small smile 316. A facial feature replacement, such as embodiments of the procedures described herein, generates an output image 330 in which face 332 is presented with a large smile 334. A reference image dataset 314 contains a series of reference images of a particular face. From reference image dataset 324, a reference image 314 can be selected with a reference smile 336 for modification, extraction and insertion into output image 330. In some embodiments, a user selects reference image 314 from reference image dataset 324. On other embodiments, automated selection of reference image 314 from reference image dataset 324 is employed.

Figure 3:
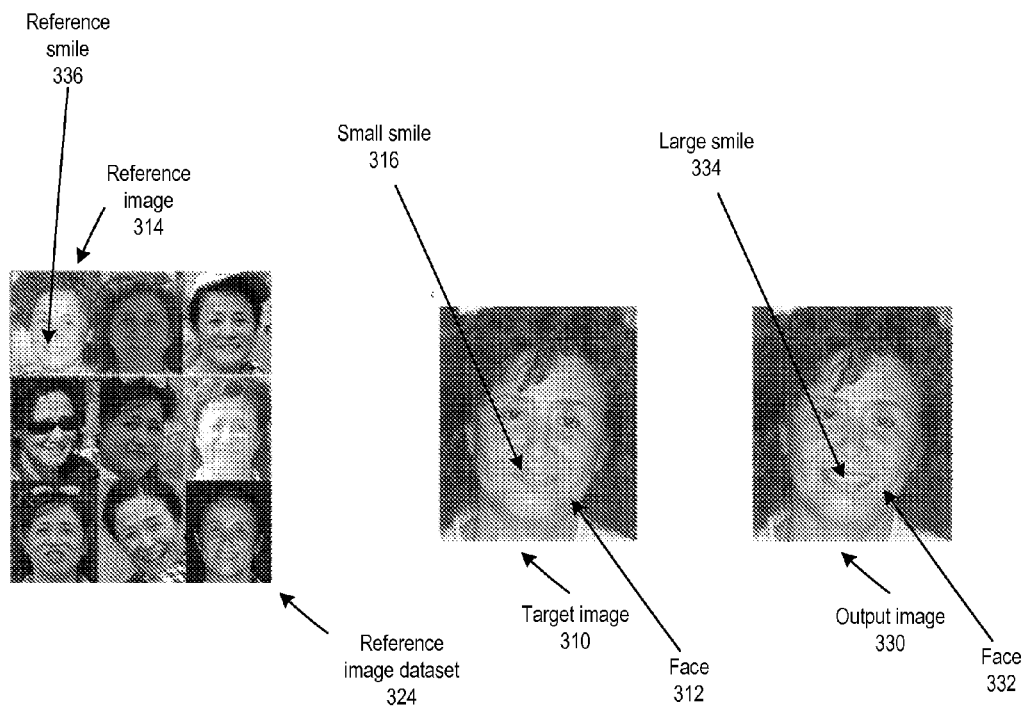
FIG. 3 illustrates inputs to and results of a process for implementing facial feature replacement according to some embodiments.
Figure 4:
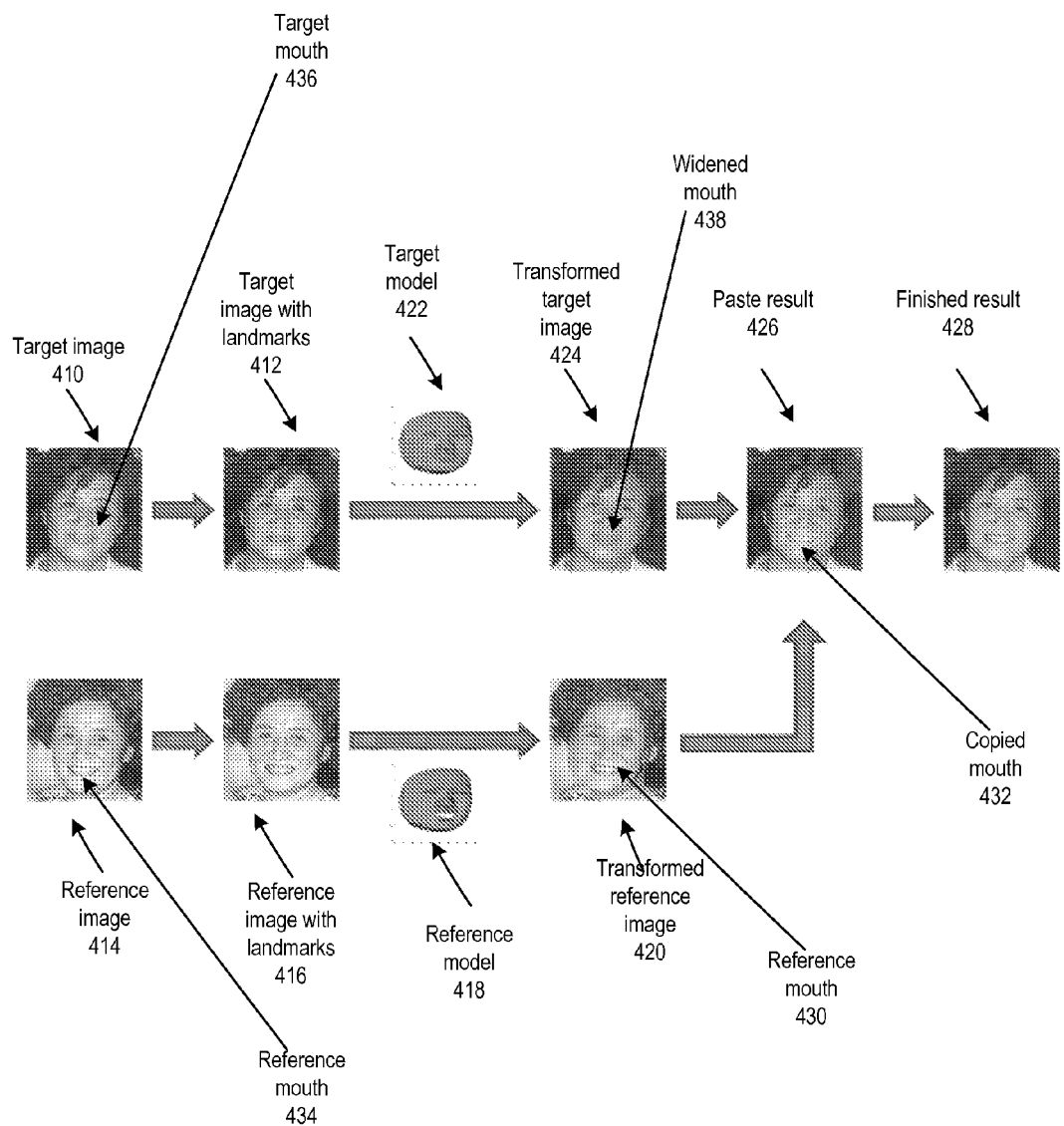
FIG. 4 depicts an image flow of intermediate results of a process for implementing facial feature replacement according to some embodiments.

The facial feature replacement illustrated in FIG. 3 is accomplished through the use and creation of a series of intermediate inputs and outputs. FIG. 4 depicts an image flow of intermediate results of a process for implementing facial feature replacement according to some embodiments. A target image 410 and a reference image 414 are selected as described above. In the example depicted in FIG. 4, target mouth 436 in target image 410 will be replaced with reference mouth 434 in reference image 414. Landmarks, such as feature points, are identified. As an illustration of these landmarks, a target image with landmarks 412 and a reference image with landmarks 416 are depicted. Reference image with landmarks is discussed below in greater detail with respect to FIGS. 6-7.

A target model 422 corresponding to target image with landmarks 412 and a reference model 418 corresponding to reference image with landmarks 416 are selected. A 3-dimensional motion flow between target model 422 and reference model 418 is calculated. This motion flow is used to generate a transformed target image 424 and a transformed reference image 420. Transformed target image 424 was warped to create a widened mouth 438 to make space for insertion of reference mouth 430 from transformed reference image 420. Reference image 420 was warped using target model 422 and reference model 418 (as well as the motion flow between them) to correct orientation and match the orientation of reference mouth 430 to the pose of transformed target image 424 and subjected to a 2-dimensional alignment to orient reference mouth 430 for insertion into transformed target image 424. In one embodiment, the warping of reference image 414 produces an effect similar to that to be expected from texture mapping reference image 414 onto reference model 418 (using corresponding feature points on reference image 414 and reference model 418), rotating the resulting textured 3D model to the 3D pose of target image 410 and projecting the textured model back onto an image plane.

A paste result 426 including a copied mouth 432 results from the insertion of reference mouth 430 into the space formerly displaying widened mouth 438. Note the difference in coloration between copied mouth 432 and the surrounding portions of paste result 426. Smoothing operations, such as color correction, are then applied to generate a finished result 428.

Mechanics of Transformations

Figure 5:
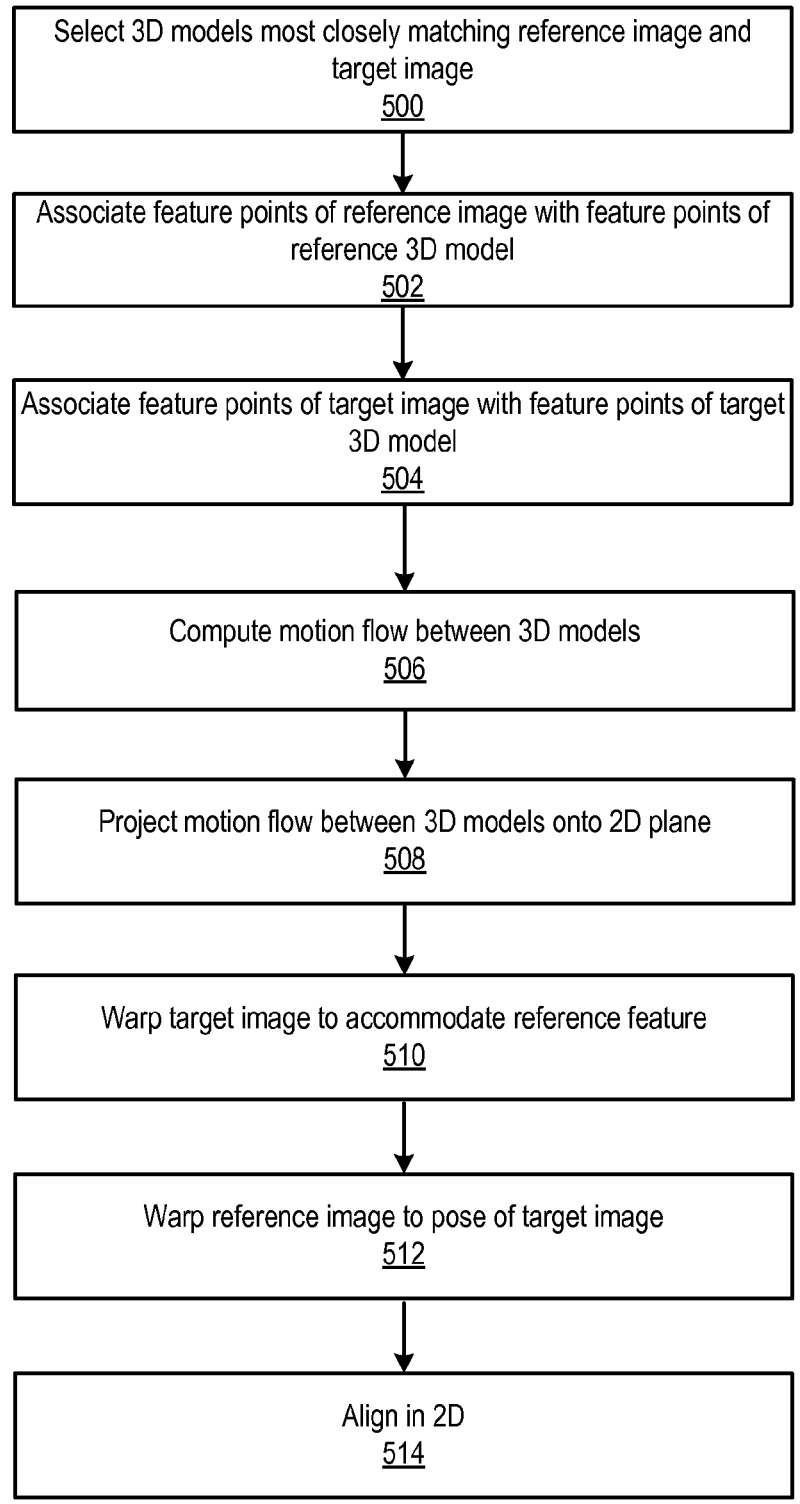
FIG. 5 is a high-level logical flowchart of a process for image transformation that can be used in the context of implementing facial feature replacement according to some embodiments.

In one embodiment, the transformations depicted in FIG. 4 illustrate the results of a series of operations for quantifying the differences between the target image and reference image and performing transformations (including warping and vertical alignment) on each image. FIG. 5 is a high-level logical flowchart of a process for image transformation that can be used in the context of implementing facial feature replacement according to some embodiments.

Three-dimensional models are selected that most closely match the reference image and the target image (500). Feature points of the reference image are associated with corresponding feature points of the 3D model corresponding to the reference image (502). Feature points of the target image are associated with corresponding feature points of the 3D model corresponding to the target image (504). A 3D motion flow between the 3D model corresponding to the target image and the 3D model corresponding to the reference image is calculated (506).

The 3D motion flow between the 3D model corresponding to the target image and the 3D model corresponding to the reference image is projected onto a two-dimensional (2D) plane (508). The target image is warped according to the projection of the 3D motion flow onto the 2D plane to accommodate the reference feature (510). The reference image is warped according to the projection of the 3D motion flow onto the 2D plane to match the orientation of the target image (512). Two dimensional alignment of the reference image is then performed if correction is required (514).

Figure 6:
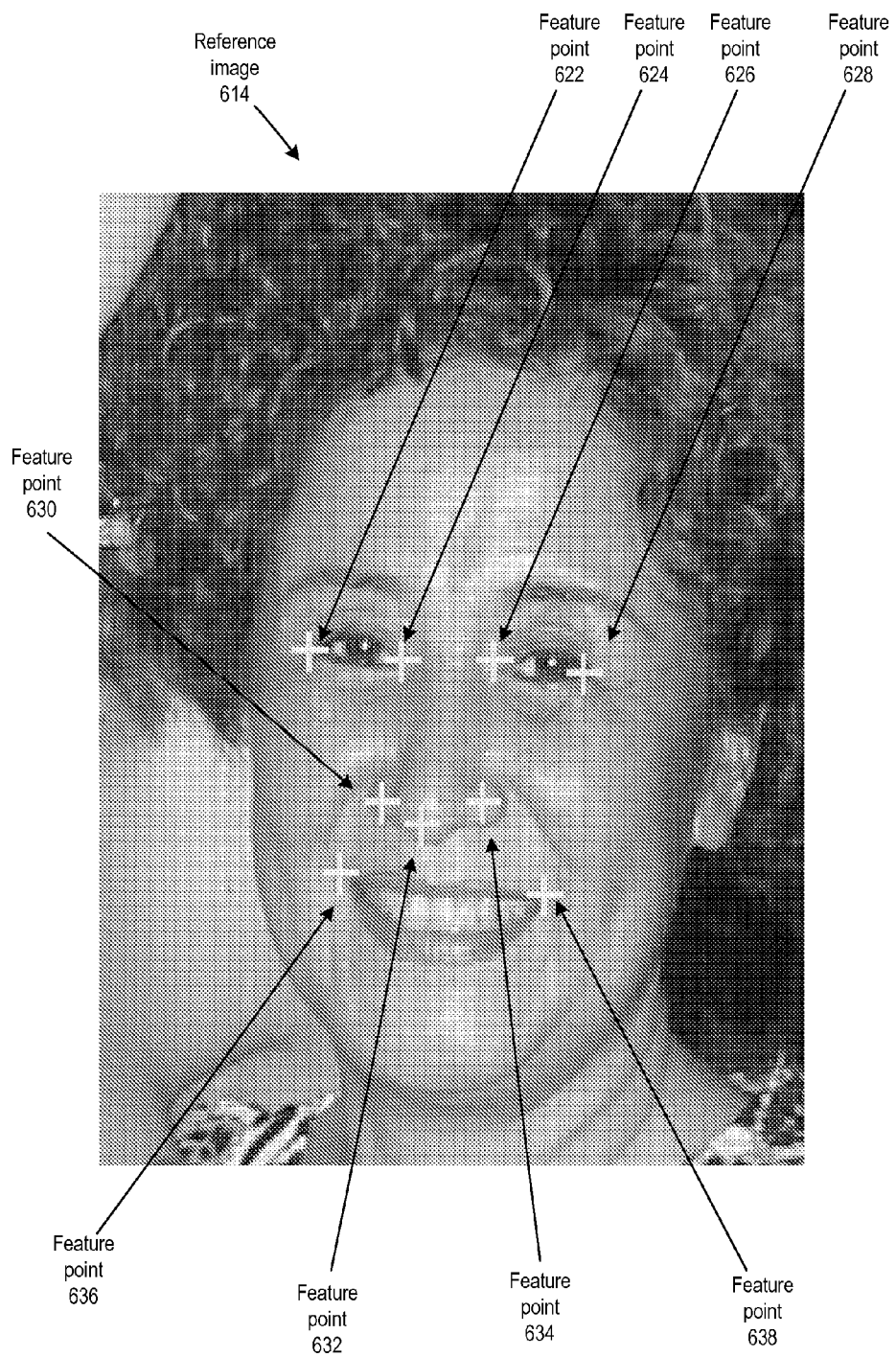
FIG. 6 illustrates results of an example of a feature recognition operation that can be used in the context of implementing facial feature replacement according to some embodiments.

FIG. 6 illustrates results of an example of a feature recognition operation that can be used in the context of implementing facial feature replacement according to some embodiments. Feature points 622-638, such as landmarks or fiducial points are identified in a reference image 614. In some embodiments, feature points 622-638 representing various features are automatically identified and associated with particular facial features by a facial feature replacement module. In other embodiments, feature points 622-638 are manually identified and associated with particular facial features by a user of a facial feature replacement module and are merely recorded by a facial feature replacement module.

As an example, feature points 622-624 define a right eye of reference image 614 by identifying eye corners of the right eye. Feature points 626-628 define a left eye of reference image 614 by identifying eye corners of the left eye. Feature points 630-634 define a nose of reference image 614 by identifying its tip and the centerpoint of each nostril. Feature points 636-638 define a mouth of reference image 614 by identifying mouth corners. The method illustrated with respect to FIG. 6, which identifies a limited number of points of a particular facial feature, performs well for features such as eyes, with respect to which limited variability of shape exists. Methods for locating feature points such as those portrayed in FIG. 6 are described by P. Felzenszwalb and D. Huttenlocher, in their article: Pictorial structures for object recognition. International Journal of Computer Vision, Vol. 61, No. 1, pp. 55-79, January 2005.

Figure 7:
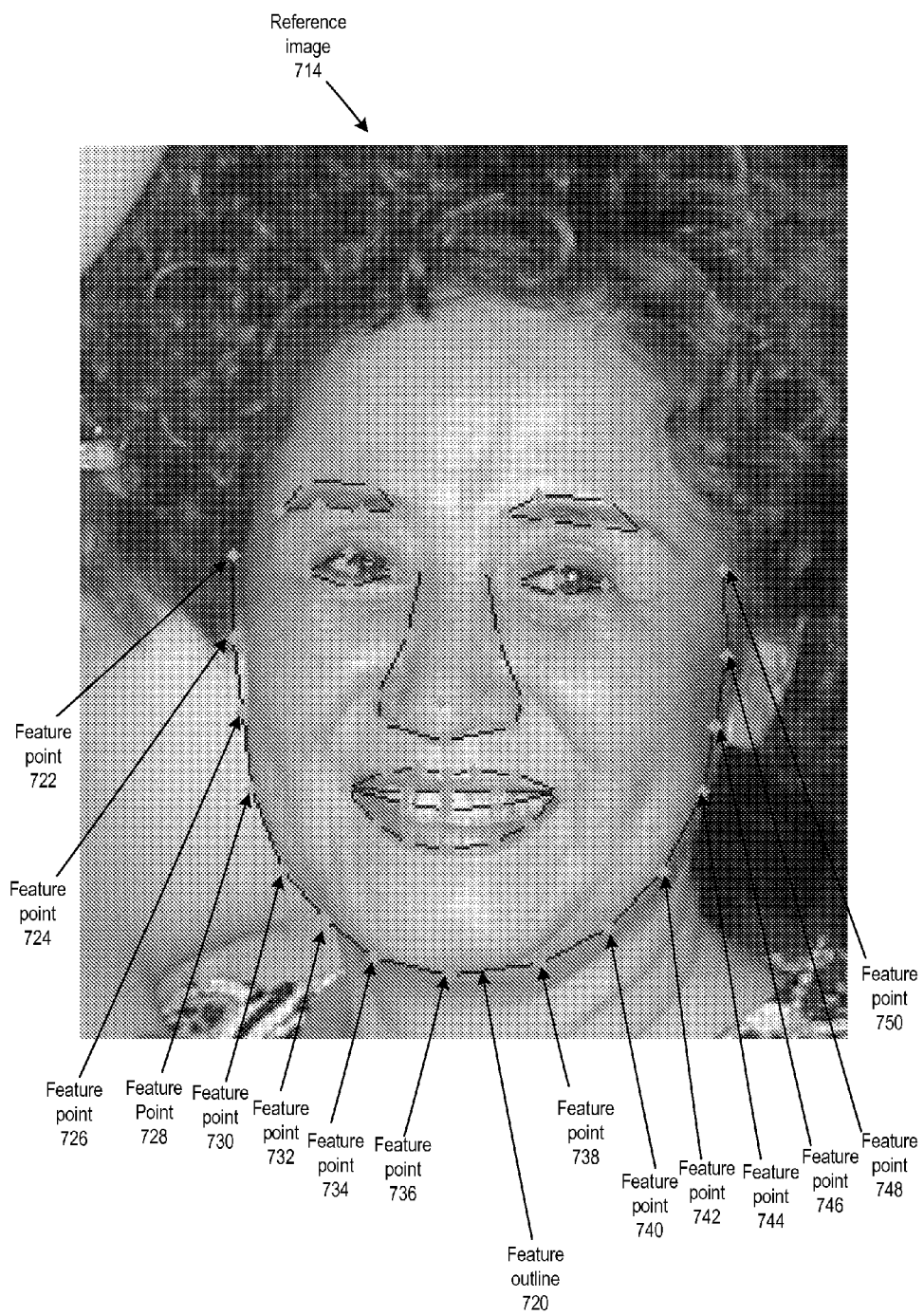
FIG. 7 depicts results of an alternative example of a feature recognition operation that can be used in the context of implementing facial feature replacement according to some embodiments.

FIG. 7 depicts results of an alternative example of a feature recognition operation that can be used in the context of implementing facial feature replacement according to some embodiments. A feature outline of a jawline 720 is presented with a series of feature points 722-750 defining the contour of the curve of jawline 720. The method illustrated with respect to FIG. 7, which identifies a larger number of points of a particular facial feature than were used in FIG. 6, is more resource intensive than the method used in FIG. 6, but performs well for features such as mouths and jawlines, with respect to which extensive variability of shape exists.

Methods for locating feature points such as those portrayed in FIG. 7 are described by Stephen Milborrow and Fred Nicolls in their article: Locating Facial Features with an Extended Active Shape Model. Proceedings of the 10th European Conference on Computer Vision, 504-513, 2008. The extended active shape model (ASM) builds linear subspaces describing how labeled points (landmarks or feature points) tend to move together as the shape of a face varies. ASM searches for feature points on the basis of a mean shape aligned to the position and size of the face. The method iteratively adjusts the locations of shape points by matching the texture around each point, and then constrains the tentative shape to a global shape model. The entire search is repeated at each level in an image pyramid, from coarse to fine resolution. Using this method, dozens of facial feature points can be located.

Figure 8:
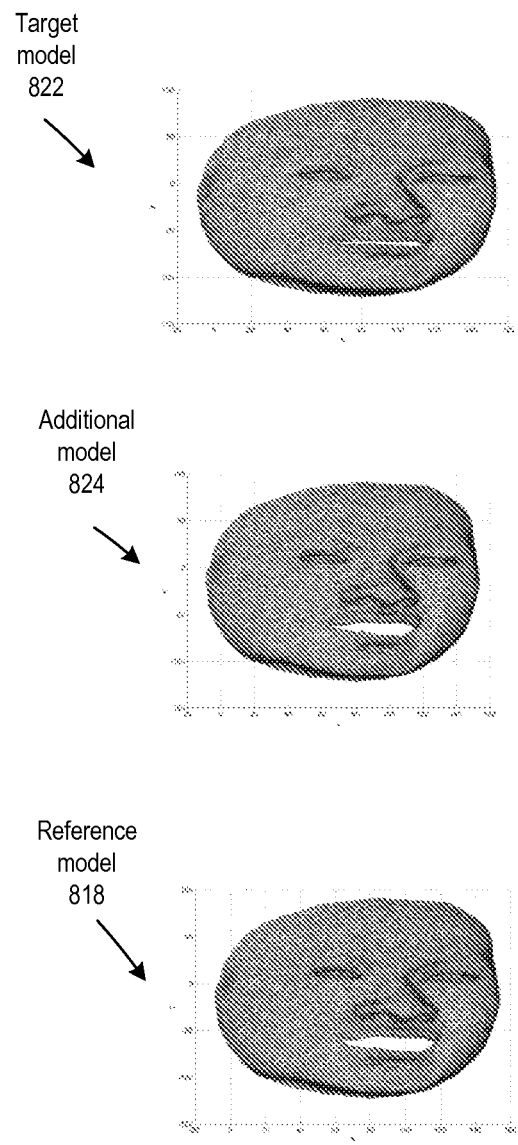
FIG. 8 illustrates an example of a set of three-dimensional facial feature models that can be used in the context of implementing facial feature replacement according to some embodiments.

FIG. 8 illustrates an example of a set of three-dimensional facial feature models that can be used in the context of implementing facial feature replacement according to some embodiments. A model database will include a series of face models that can be used for the calculations of 3D motion flow described above. In some embodiments, a model database can be built on a custom basis from a database of reference images. Alternatively, a publicly available database exists in the space-time face dataset created by Li Zhang, Noah Snavely, Brian Curless, and Steven M. Seitz, which is published as Spacetime Faces: High-resolution capture for modeling and animation, in ACM SIGGRAPH Proceedings, Los Angeles, Calif., August, 2004. This publicly available dataset contains a series of high resolution face scans under various face expressions.

In some embodiments, subsets of a model database are selected and feature points (not shown) are applied to the models of the model dataset. In some embodiments, feature point application to a model dataset can be automated. In other embodiments, feature points are manually applied to the model dataset.

A target model 822 can be selected for correspondence to the target image. Because the target image discussed with respect to the examples portrayed in FIGS. 3-4 has a small smile that is being replaced with a larger smile from a reference image, target model 822 is chosen for its small smile. Similarly a reference model 818 is chosen for its large smile. An additional model 824 is not selected, due to its intermediate smile that is similar to neither the target image nor the reference image.

FIGS. 9A-10B illustrate results of image transformation operations that can be used in the context of implementing facial feature replacement according to some embodiments.

Figure 9A:
FIGS. 9A-10B illustrate results of image transformation operations that can be used in the context of implementing facial feature replacement according to some embodiments.
Figure 9B:

FIG. 9A depicts a target image 910 before any transformations are applied. Referring back to FIG. 4, target image 910 corresponds to target image 410. FIG. 9B illustrates a transformed target image 924 with an expanded mouth 926, which is the result of a warping of target image 910 to provide space for insertion of a mouth feature from a reference image. As can be seen from a comparison of FIG. 9B to FIG. 9A, target image 910 has been warped to provide greater space in the area now occupied by expanded mouth 926.

The process of warping target image 910 is most easily understood with reference back to FIG. 4, in which warping of a target image 410 is accomplished by identifying landmarks, such as those portrayed in target image with landmarks 412, and selecting a target model 422 based on the identified landmarks. Similarly, landmarks in a reference image, such as those in reference image with landmarks 416 have been identified and a reference model 418 has been selected based on the identified landmarks. A 3-dimensional motion flow has been calculated, representing the difference in position between the target model and the reference model. This 3-dimensional motion flow is mathematically projected onto a 2D image plane to control the warping of target image 410 and reference image 414.

Specifically, with respect to FIG. 9A, comparison of the selected models indicates that the larger smile necessitates movement of lower portions of the face to create additional room for the insertion of a larger mouth. This effect is quantified from a 2D projection of a motion flow and applied as a warping of the lower regions of the face, including expanded mouth 926, in transformed target image 924.

Figure 10A:
Figure 10B:

FIG. 10A depicts a reference image 1014 before any transformations are applied. Referring back to FIG. 4, reference image 1014 corresponds to reference image 414. FIG. 10B illustrates a transformed reference image 1020, in which a reoriented mouth (and reorientation of other parts of the lower face) has resulted from a warping of reference image 1014 to match the orientation or pose of expanded mouth 1026 of FIG. 9B.

The execution of the warping from reference image 1014 to transformed reference image 1020 is similar to that described above for FIGS. 9A and 9B and is most easily understood with reference back to FIG. 4, in which warping of a reference image 1014 is accomplished by identifying landmarks, such as those portrayed in reference image with landmarks 416, and selecting a reference model 418 based on the identified landmarks. Similarly, landmarks in the target image, such as those in target image with landmarks 412 have been identified and a target model 422 has been selected based on the identified landmarks. A 3-dimensional motion flow has been calculated, representing the difference in position between the target model and the reference model. This 3-dimensional motion flow is mathematically projected onto a 2D image plane to control the warping of target image 410 and reference image 414.

Specifically, with respect to FIG. 10A, comparison of the selected models indicates that the differences in facial orientation between target image 910 and reference image 1014 necessitate movement of lower portions of the face to create corresponding alignment. This effect is quantified from a 2D projection of a motion flow and applied to the lower regions of the face, including reoriented mouth 1022, in transformed reference image 1020.

A two-dimensional alignment correction is also, in some embodiments, applied as a fine-tuning of the orientation of reoriented mouth 1022. Specifically, after warping both the target image to generate transformed target image 924 and a reference image to generate transformed reference image 1020, the two faces contained in transformed target image 924 and transformed reference image 1020 are roughly aligned. However, additional improvement in alignment is available. To further align the two faces, embodiments may apply the Lucas-Kanade method to further improve alignment between transformed target image 924 and transformed reference image 1020. Further information with respect to this method is available from Simon Baker, Ralph Gross and Iain Matthews in Lucas-Kanade 20 Years On: A Unifying Framework. International Journal of Computer Vision. 56(3), 221-255, 2004. Additional information is available from Bruce D. Lucas and Takeo Kanade in An iterative image registration technique with an application to stereo vision. Proceedings of the International Joint Conference on Artificial Intelligence, pp. 674-679. Such an alignment minimizes the sum of squared error between two images: the target image T and the reference image I, which is further warped by a function W:

$$\sum_x [I(W(x)) - T(x)]^2$$

The minimization of the above energy function is a non-linear optimization task, and is solved iteratively by an Inverse Compositional Algorithm.

Figure 11A:
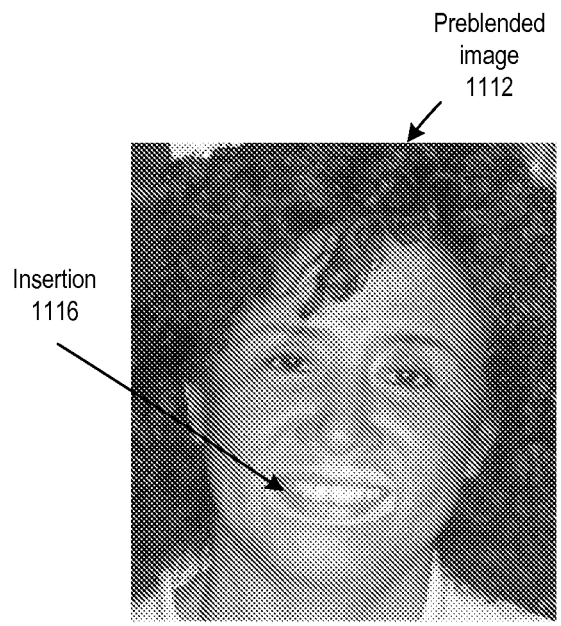
FIG. 11A depicts results of a feature insertion operation that can be used in the context of implementing facial feature replacement according to some embodiments.
Figure 12:
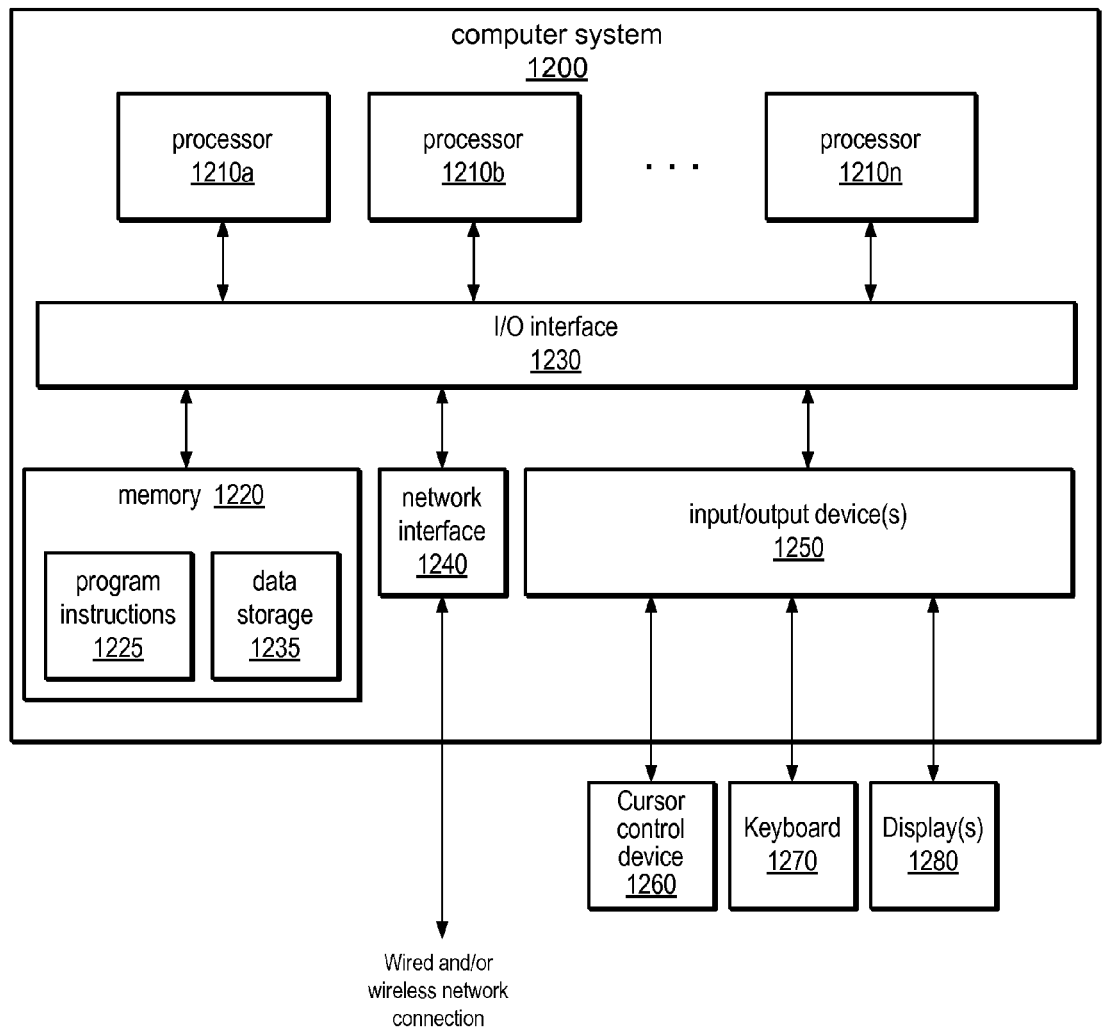
FIG. 12 depicts an example computer system that may be used in embodiments.

FIG. 11A depicts results of a feature insertion operation that can be used in the context of implementing facial feature replacement according to some embodiments. A pre-blended image 1112 can be create by copying reoriented mouth 1022 into transformed target image 924. The insertion 1116 containing the mouth, however, is different in terms of color from the remainder of pre-blended image 1112. This difference in coloration is corrected by finishing steps, such as color correction.

Figure 11B:
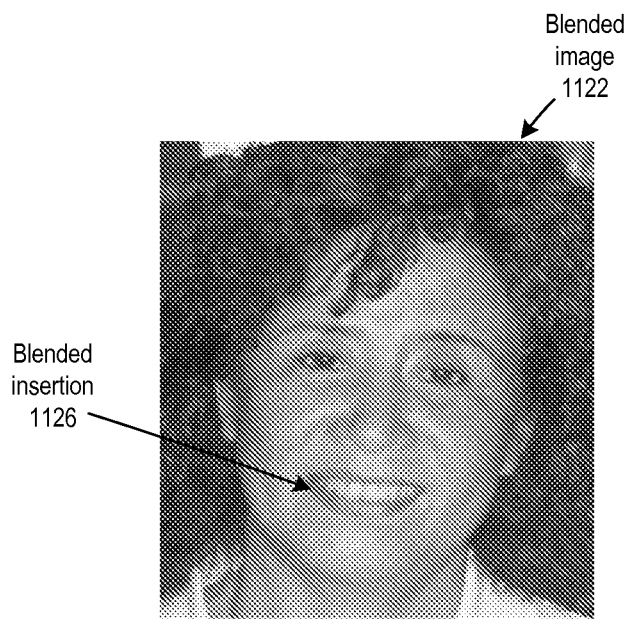
FIG. 11B illustrates results of a blending operation that can be used in the context of implementing facial feature replacement according to some embodiments.

FIG. 11B illustrates results of a blending operation that can be used in the context of implementing facial feature replacement according to some embodiments. After color correction, a blended insertion 1126 matches a blended image and a plausible finished result of the process of facial feature replacement has been created. Such a blending operation can be accomplished using a gradient compositing method, such as that described by Aseem Agarwala, Mira Dontcheva, Maneesh Agrawala, Steven Drucker, Alex Colburn, Brian Curless, David Salesin, and Michael Cohen, in their article Interactive digital photomontage. ACM Transactions on Graphics, Volume 23, Issue 3, 2004.

Example System

Embodiments of a facial feature replacement module and/or of the facial feature replacement image techniques as described herein may be executed on one or more computer systems, which may interact with various other devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a facial feature replacement editing module are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200.

In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of a facial feature replacement editing module as described herein, and data storage 1235, comprising various data accessible by program instructions 1225. In one embodiment, program instructions 1225 may include software elements of embodiments of a facial feature replacement module as illustrated in the above Figures. Data storage 1235 may include data that may be used in embodiments. In other embodiments, other or different software elements and data may be included.

Those skilled in the art will appreciate that computer system 1200 is merely illustrative and is not intended to limit the scope of a facial feature replacement module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method comprising:
    selecting a feature from a reference image to include in a target image;
    detecting a set of feature points associated with the selected feature in each of the target image and the reference image;
    associating a first three-dimensional model with the target image based on the set of feature points detected in the target image, the first three-dimensional model including feature points that correspond to the set of feature points detected in the target image;
    associating a second three-dimensional model with the reference image based on the set of feature points detected in the reference image, the second three-dimensional model including feature points that correspond to the set of feature points detected in the reference image;
    determining a difference in spatial alignment between the feature points of the first three-dimensional model and the second three-dimensional model;
    warping the target image to accommodate the selected feature from the reference image based, at least in part, on the determined difference in spatial alignment between the feature points of the first three-dimensional model and the second three-dimensional model;
    warping the reference image to match an orientation of the target image based, at least in part, on the determined difference in spatial alignment between the feature points of the first three-dimensional model and the second three-dimensional model; and
    responsive to warping the target image and warping the reference image, copying the selected feature from the reference image to the target image.

2. The computer-implemented method of claim 1, further comprising blending the selected feature into the target image.

3. The computer-implemented method of claim 1, further comprising selecting the reference image based on the selected feature and a similarity to the target image.

4. The computer-implemented method of claim 1, further comprising correcting illumination to achieve shadows and to normalize differences in position, intensity and color temperature of light applied to photographic subjects of the reference image and the target image.

5. The computer-implemented method of claim 1, wherein the warping the target image comprises accommodating a facial shape in the target image to receive the selected feature.

6. The computer-implemented method of claim 1, wherein the first three-dimensional model and the second three-dimensional model are different three-dimensional models.

7. The computer-implemented method of claim 1, wherein the selected feature is a facial feature.

8. A system, comprising:
    at least one processor; and
    a memory comprising program instructions, wherein the program instructions are executable by the at least one processor to:
        detect, in a target image and a reference image, a set of feature points defining one or more features of a face;
        select a first three-dimensional model corresponding to the target image based on the set of feature points detected in the target image;
        select a second three-dimensional model corresponding to the reference image based on the set of feature points detected in the reference image;
        warp the target image to accommodate a selected feature from the reference image based, at least in part, on the set of feature points detected in the target image and the reference image, the first three-dimensional model and the second three-dimensional model;

warp the reference image to a pose of the target image based, at least in part, on the set of feature points detected in the target image and the reference image, the first three-dimensional model and the second three-dimensional model; and copy the selected feature from the warped reference image to the warped target image.

9. The system of claim 8, further comprising program instructions executable by the at least one processor to correct illumination to achieve shadows and to normalize differences in position, intensity and color temperature of light applied to photographic subjects of the reference image and the target image.

10. The system of claim 8, wherein to warp the reference image further comprises program instructions executable by the at least one processor to correct an orientation of the selected feature of the reference image to match an orientation of the target image.

11. The system of claim 8, wherein to warp the target image further comprises program instructions executable by the at least one processor to modify one or more feature points of the target image to accommodate copying the selected feature into the target image.

12. The system of claim 8, further comprising program instructions executable by the at least one processor to calculate a three-dimensional motion flow between the first three-dimensional model and the second three-dimensional model.

13. The system of claim 12, wherein to warp the target image and to warp the references image are further based on the three-dimensional motion flow.

14. The system of claim 12, further comprising program instructions executable by the at least one processor to:

project the three-dimensional motion flow onto a two-dimensional plane; and warp the target image based on the projection of the three-dimensional motion flow onto the two-dimensional plane.

15. A computer-readable storage device storing program instructions, wherein the program instructions are computer-executable to implement:

detecting, in a target image and a reference image, a set of feature points for defining features of a face;

warping feature points of the target image to accommodate a selected facial feature from the reference image using the set of feature points;

warping feature points of the reference image to a pose of the target image using the set of feature points; and copying the selected facial feature from the reference image to the target image based, at least in part, on the warped feature points of the target image and the warped feature points reference image.

16. The computer-readable storage device of claim 15, wherein the program instructions are further computer-executable to implement blending the selected facial feature into the target image.

17. The computer-readable storage device of claim 15, wherein the program instructions are further computer-executable to implement selecting the reference image based on the selected facial feature and a similarity to the target image.

18. The computer-readable storage device of claim 15, wherein the program instructions are further computer-executable to implement correcting illumination of subjects of the reference image and the target image.

19. The computer-readable storage device of claim 15, wherein the program instructions are further computer-executable to implement selecting a first three-dimensional model corresponding to the target image and a second three-dimensional model corresponding to the reference image.

20. The computer-readable storage device of claim 15, wherein the program instructions are further computer-executable to implement:

comparing the target image to a set of three-dimensional models;

responsive to the comparing, determining a score for each three-dimensional model compared to the target image; and selecting a three-dimensional model from the set of three-dimensional models to associate with the target image based, at least in part, on the determined score for each three-dimensional model, wherein the warping of the feature points of the target image is based on the selected three-dimensional model.

* * * * *